US005936183A

United States Patent [19]

McNulty, Sr.

[11] Patent Number: 5,936,183

[45] Date of Patent: *Aug. 10, 1999

[54] NON-LETHAL AREA DENIAL DEVICE

[75] Inventor: James F. McNulty, Sr., Anaheim, Calif.

[73] Assignee: Barnet Resnick, Newport Beach, Calif.

[ * ] Notice: This patent is subject to a terminal disclaimer.

[21] Appl. No.: 08/991,268

[22] Filed: Dec. 16, 1997

[51] Int. Cl.[6] .............................. B64D 1/04; F42C 22/02; H01G 23/00

[52] U.S. Cl. ........................... 89/1.11; 102/426; 102/427; 361/232

[58] Field of Search ..................................... 89/1.11, 1.34; 102/427, 428, 426, 424, 404; 361/232

[56] References Cited

U.S. PATENT DOCUMENTS

| | | | |
|---|---|---|---|
| 3,523,538 | 8/1970 | Shimizu | 89/1.11 |
| 3,803,463 | 4/1974 | Cover | 89/1.11 |
| 4,712,479 | 12/1987 | Babel | 102/427 |
| 5,345,874 | 9/1994 | Lemonnier et al. | 102/424 |
| 5,473,501 | 12/1995 | Claypool | 89/1.11 |
| 5,654,867 | 8/1997 | Murray | 361/232 |
| 5,675,103 | 10/1997 | Herr | 89/1.11 |
| 5,786,546 | 7/1998 | Simson | 89/1.11 |

*Primary Examiner*—Charles T. Jordan
*Assistant Examiner*—Theresa M. Wesson
*Attorney, Agent, or Firm*—Leonard Tachner

[57] ABSTRACT

A non-lethal alternative to the anti-personnel landmine. The TASER® alternative uses electronic stun capability in combination with a landmine housing and deployment system. The device can cover a radius of 15 feet (30 feet possible) and can be triggered by various sensors. Although the TASER® non-lethal area denial device would cause no deaths or injuries if accidentally triggered by friendly forces, it can also be permanently disabled when no longer needed, by remotely using a secure code to shut down the TASER® system. When triggered, the device launches darts in multiple directions at 10 or 20 degree intervals in a direction generally facing the enemy. The darts temporarily incapacitate any persons within an inch of the darts by causing uncontrollable spasms of the near surface motor control muscles causing temporary loss of the subject's motor control functions. The subject will fall and temporarily be completely incapacitated. The device will take down persons wearing soft body armor because high voltage electricity readily arcs through the fabric weaving holes. A timing circuit keeps the subjects incapacitated until they can be taken into custody by nearby troops. After the very low power signal is turned off, the subject will recover within minutes. The TASER® device produces no collateral damage and poses no lethal threat to friendly forces even if accidentally triggered. The device may be remotely shut down permanently via an encrypted security code.

7 Claims, 4 Drawing Sheets

NON-LETHAL AREA DENIAL DEVICE

BACKGROUND OF THE INVENTION

1. Field of the Invention

The present invention relates generally to a non-lethal device for temporarily disabling personnel. It relates more specifically to a mine-like device that automatically fires a plurality of high voltage probes in a range of directions to effect personnel in proximity to the device but without causing death or permanent disability.

2. Background Art

Anti-personnel landmines cause thousands of deaths and severe crippling injuries for many years after they have been abandoned. Many of the innocent victims are children. Finding all of these deadly booby traps is nearly impossible. As a result of international concern about the high number of unnecessary injuries and deaths from these mines, there is strong agreement among governments of the necessity to eliminate these brutal lethal weapons. This has resulted in an international treaty to ban lethal Anti-Personnel Landmines. The United States has not yet agreed to this treaty due to concerns about security in Korea. However, most military forces see the continuing need to deny enemy access to areas or to delay access until troops can man defenses.

SUMMARY OF THE INVENTION

The present invention employs the well proven non-lethal TASER® weapon and configures it as a non-lethal area denial device, similar to a anti-personnel mine, with multiple independent standoff incapacitation devices that can temporarily incapacitate several subjects without injury when activated by sensors. The TASER® device has been proven safe by 18 years of use by over 400 law enforcement agencies and by many studies, including one by the Medical Director of the U.S. Consumer Products Safety Commission. The TASER® alternative to the landmine will not cause deaths or injuries if accidentally actuated by friendly forces or innocent civilians.

The non-lethal TASER® Area Denial Device can be deployed along defensive line perimeters or anti-tank mine fields to prevent enemy reconnaissance troops or small raiding parties from penetrating lines and for their capture. After the TASER®-ed troops are captured the device may be quickly reloaded by field troops for immediate reuse. In the event of a mass attack, the TASER® devices will incapacitate the forward line of the enemy (and any enemy troops that touch the incapacitated troops). The TASER® devices also instill strong fear into any remaining troops due to the human's inherent fear of electricity. This will give "ready troops" time to respond and even counterattack without resistance by the enemy's front line troops.

In peacekeeping missions, the TASER® Area Denial Device can be used to secure storage areas as well as troop facilities and prevent looting or sabotage. It will permit the capture of looters or saboteurs without injury to either the culprit or the security forces. The non-lethal TASER® Area Denial Device can also be deployed to keep opposing forces within their assigned areas to prevent conflicts using minimal forces.

The TASER® devices may also be used to prevent subjects from following forces when they are withdrawing from an area. After the withdrawal is complete the non-lethal TASER® Area Denial Devices may be deactivated from a remote position to prevent accidental triggering by civilians.

The inventive device comprises a non-lethal alternative to the anti-personnel landmine. The TASER® alternative uses electronic stun capability in. combination with a landmine housing and deployment system. The device can cover a radius of 15 feet (30 feet possible) and can be triggered by various sensors. Although the TASER® device would cause no deaths or injuries if accidentally triggered by friendly forces, it can also be permanently disabled when no longer needed, by remotely using a secure code to shut down the TASER® system.

When triggered, the device launches darts in multiple directions at 10 or 20 degree intervals in a direction generally facing the enemy. The darts temporarily incapacitate any persons within an inch of the darts by causing uncontrollable spasms of the near surface motor control muscles causing temporary loss of the subject's motor control functions. The subject will fall and temporarily be completely incapacitated.

The device will take down persons wearing soft body armor because high voltage electricity readily arcs through the fabric weaving holes. A timing circuit keeps the subjects incapacitated until they can be taken into custody by nearby troops. After the very low power signal is turned off, the subject will recover within minutes. The TASER® device produces no collateral damage and poses no lethal threat to friendly forces even if accidentally triggered. The device may be remotely shut down permanently via an encrypted security code.

The conventional, hand-held TASER® device has been proven safe and effective in over 18 years of police use by more than 400 major law enforcement agencies in the United States. The TASER® is used by universities such as University of Southern California, Duke University, University of Cincinnati, Black Hawk College and by many airports. It is also used by the U.S. Department of Justice to protect their Washington D.C. headquarters.

OBJECTS OF THE INVENTION

It is therefore a principal object of the present invention to provide an anti-personnel device that is non-lethal.

It is another object of the invention to provide a device for automatically, temporarily disabling personnel at or near the device.

It is still another object of the invention to provide a personnel disabling device which senses adjacent personnel and automatically fires at least one dart for transmitting a high voltage, low current charge to temporarily incapacitate such personnel.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 4*a* is a schematic illustration showing the preferred configuration for using two inventive devices in combination.

DETAILED DESCRIPTION OF A PREFERRED EMBODIMENT

Figure 1:
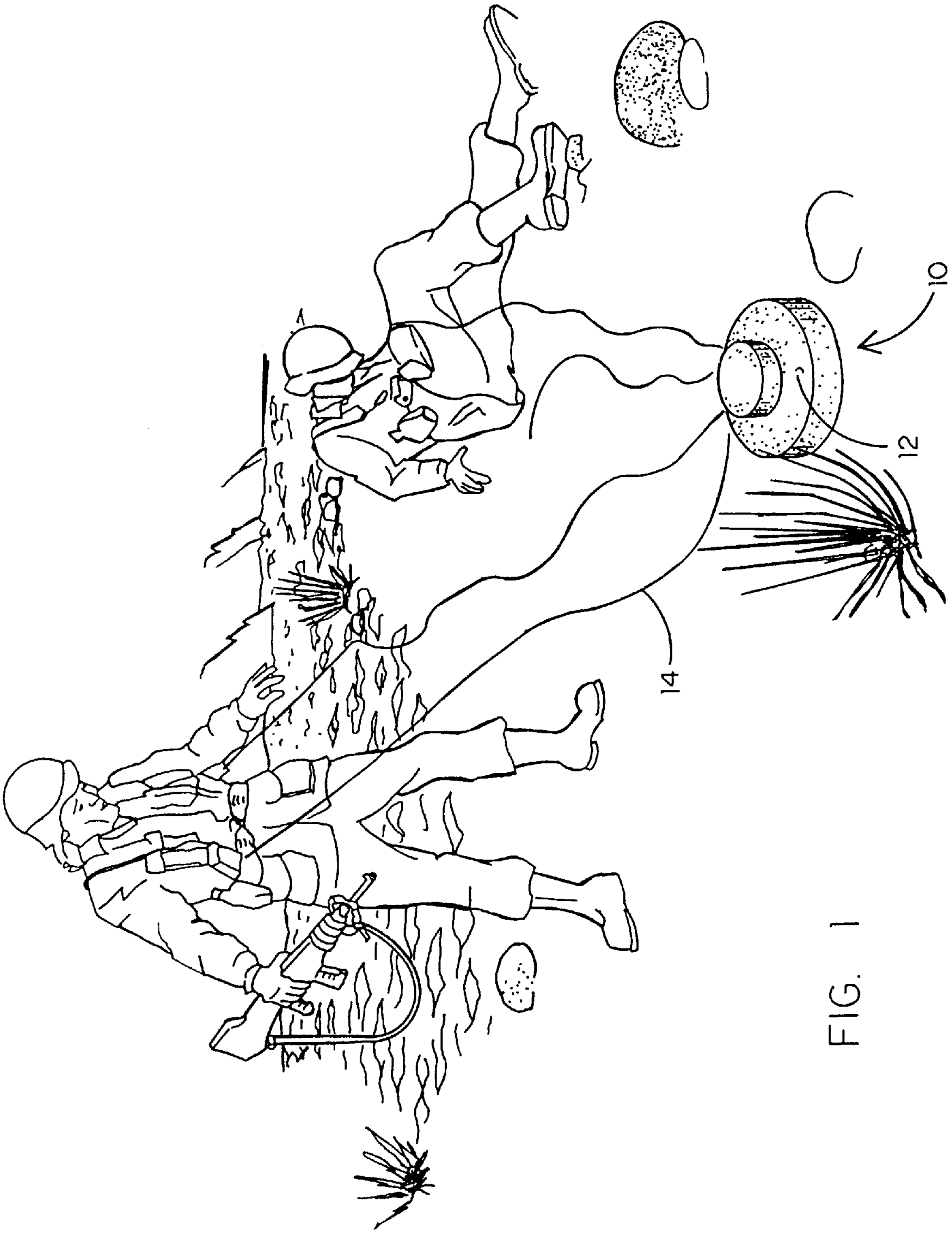
FIG. 1 is an illustration of the invention being deployed in a battlefield environment to disable military personnel.
Figure 2:
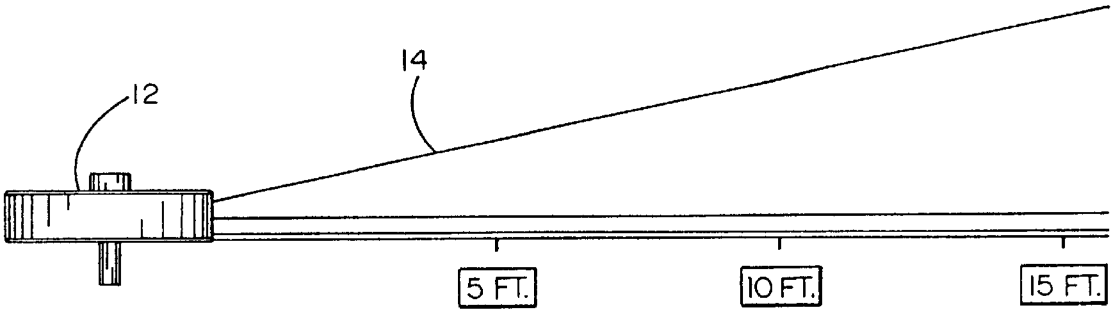
FIG. 2 is a side view of the invention illustrating the approximate paths of deployed darts.
Figure 3:
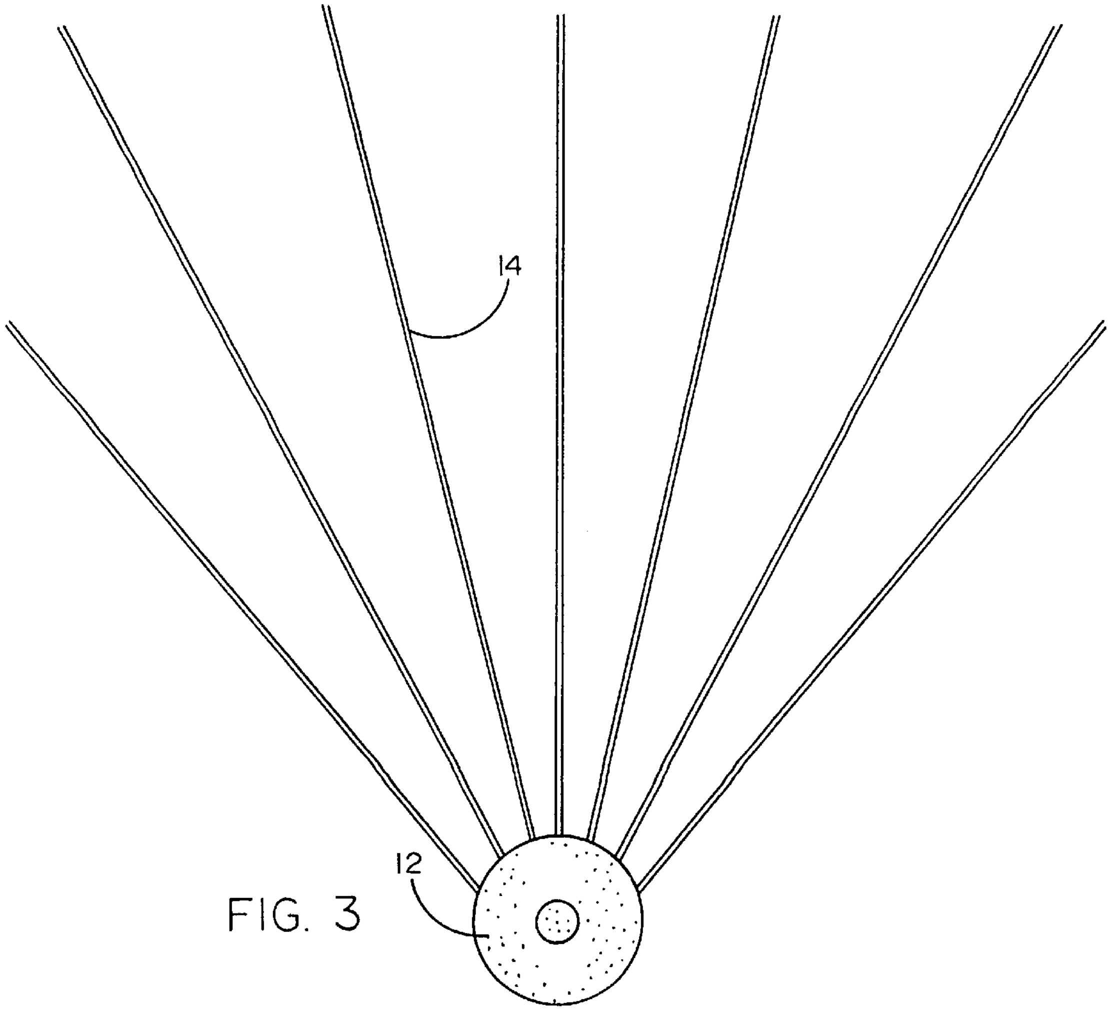
FIG. 3 is a top view of the invention illustrating the approximate paths of deployed darts.

Reference will now be made to the accompanying figures wherein the invention 10 is implemented by using arrays of off-the-shelf TASER® firing bays 20 in a housing 12 having a flat cylindrical shape. The firing bays 20 are set 20 degrees apart over a 120 degree minimum area toward the expected threat. Separate TASER® circuits 16 are centrally mounted and the batteries mounted on the bottom surface. The firing bays are arranged so that the upper dart rises one foot for each five feet of range for a short range unit and 1 foot for each ten feet of range in long range units (FIG. 2).

The lower dart 17 from each firing bay is fired straight out horizontally. The firing bay is angled slightly so that the lower dart hits at a height of about 1–1.5 feet at a 15 foot range. This is the positive voltage lead 14. The negative lead is angled to reach a height of 4.5 feet at 15 feet. The negative lead is connected to an electrode imbedded in the ground (earth). This connection provides a contact path from either the upper dart (negative) to the lower dart (positive) or from the lower dart to earth (negative) increasing the take down rate.

In this manner the devices can take down a crawling soldier (from earth to a single positive dart) or a standing soldier (from positive dart to upper negative dart). A standing or crouching soldier could also be taken down between earth and the positive dart even if the upper dart misses. The device could take down multiple subjects that approach at the same time. The subject is disabled for the duration of the applied power plus a few minutes after the power is turned off. Therefore, long life batteries controlling the TASER® circuit are configured to run for a minimum of 10 minutes (variable depending on battery size), with 1 second breaks every 10 seconds to allow the subject to breath freely under worst case conditions.

The activation circuit 22 when triggered, sends an alarm signal to nearby troops when triggered. The signal indicates the device's coordinates.

The TASER® system does not have to touch or penetrate a person's skin. The electrical pulse generated at the high voltage transformer 18, will easily arc through more than an inch of clothing or the weave of soft body armor.

At this range the TASER® device may be activated by various low cost methods, such as infrared motion detector, trip wires, pressure plates or a combination of two or more of these methods.

Figure 4:
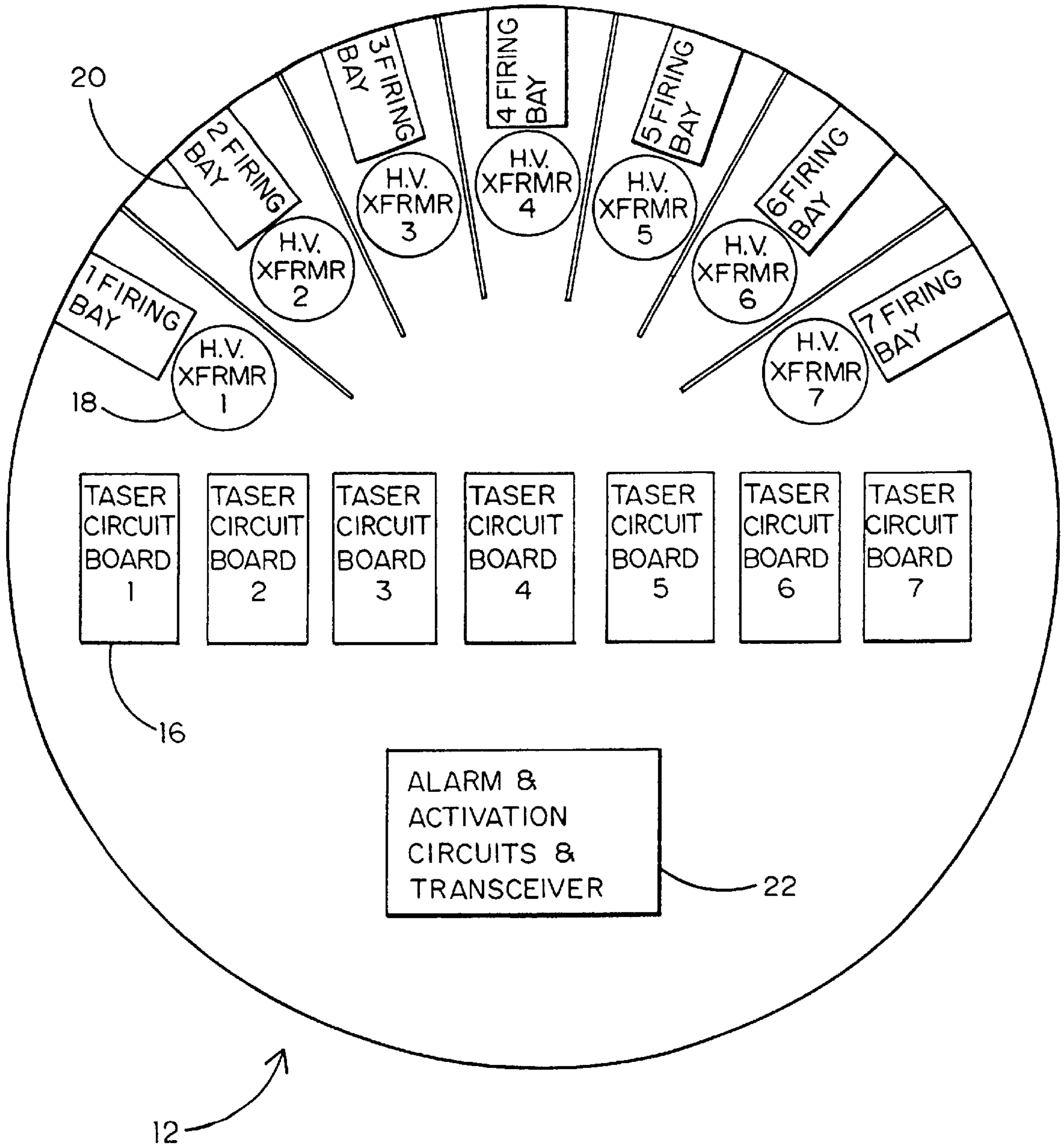
FIG. 4 is a mechanical layout drawing of a preferred embodiment of the invention.

A 30 foot range system may also be implemented. Long range or high density devices may be assembled by stacking two 2–3 inch thick 20 degree deployment TASER® discs so that one disc is automatically offset radially by 10 degrees to provide twice the number of dart sets, each offset by 10 degrees from the next dart set as shown schematically in FIG. 4*a*.

While more expensive than crude landmines initially, the non-lethal TASER® device is field reloadable after use and can be used repetitively for years. This capability reduces the number of devices required, reducing the long term overall cost.

A remote alarm signal carrying the device's coordinate code is transmitted via radio or satellite to a central site when the device is triggered. The signal identifies the location of activation for nearby troops. Troops may respond to the alarm to secure the area and take Tasered prisoners. The alarm circuitry can also be utilized by the controlling troops to remotely control the TASER® device via secure encrypted codes. After securing prisoners, the TASER® device can be quickly reloaded in the field. The TASER® device may be permanently deactivated when no longer needed, using secure codes.

The TASER® area denial device may also be used to replace manned guard towers in fixed installations. Dummy units positioned among an array of live devices could also be utilized to reduce costs.

Figure 5:
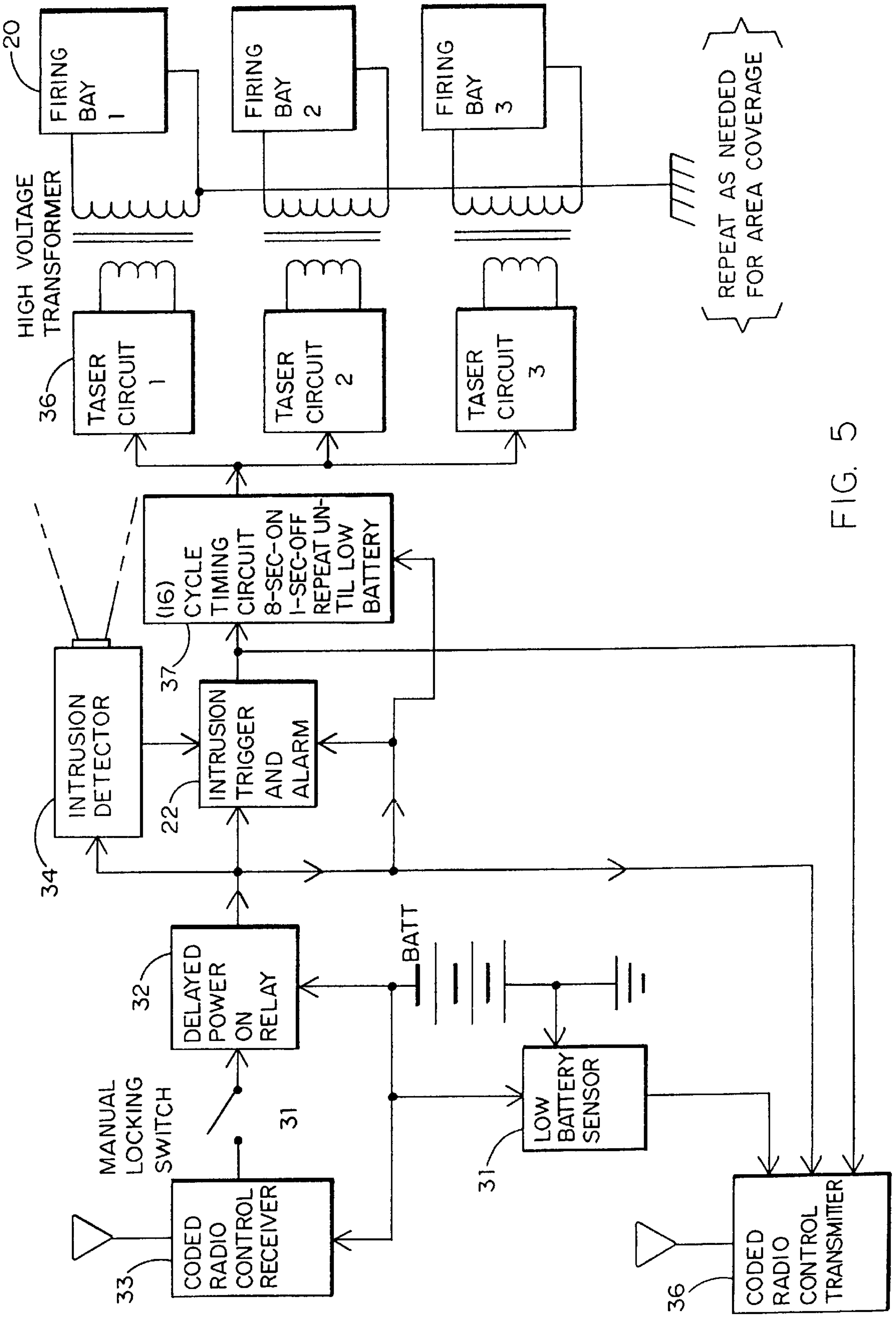
FIG. 5 is an electrical block diagram of the preferred embodiment.

Referring to FIG. 5 it will be observed that when Manual locking switch (31) is closed, power is applied to the "Delayed Power On" Relay (32). The power on relay after a preprogrammed delay will apply battery power to all circuits arming the device.

If a properly coded radio signal is received by the Radio Control Receiver (33) it will remove power from the Power on Relay's coil disarming the device and making it safe to handle.

When armed, as noted above and the Intrusion Sensor (34) senses an intruder in any area within 80 percent of the device's maximum range, it will signal the "Intrusion Trigger and Alarm Circuit" (22). The Intrusion Trigger and Alarm Circuit (22) will send a coded alarm signal with the device's coordinates to nearby troops via Radio Control Transmitter (36). The Intrusion Trigger and Alarm Circuit will also trigger Cycle Timing Circuit (37).

The Cycle Timing Circuit (37) once triggered, will continually apply power to the TASER® Circuits (36) for 8 seconds out of every 9–10 seconds. The first application of power to the TASER® Circuit (16) will immediately cause all of the Firing Bays (20) to simultaneously fire their respective cartridges sending their darts out at various angles toward the intruders.

When power is applied to them, the TASER® Circuits (16) will each generate an independent oscillator output pulse of 4–8 microseconds duration repeated 10–25 times per second. The energy of this output is limited to less than 0.4 Joules by the energy storage of the oscillator transformer.

The output of each TASER® Circuit (16) is then stepped up by High Voltage Transformer (18) to 50,000 to 60,000 volts.

The output of High Voltage Transformer (18) is applied to Firing Bay (20). The Firing Bays are each loaded with a standard police TASER® cartridge having two darts oriented at different elevation angle. The firing bays are located on the edge of the device facing the intruders or enemy. They are set over about a 120 degree angle facing the area of intrusion. Independent circuits and firing bays are used to limit the power if only one subject is hit and to prevent losing power if a set of darts, that did not hit a subject, short circuits: The number of circuits and firing bays used depends on the coverage desired with seven being typical for short ranges and fourteen for longer range.

Low Battery Sensor (35) sends a warning to the nearby troops via the Radio Control Transmitter (36) when the battery is approaching depletion.

It will now be seen that the illustrated preferred embodiment of the invention would satisfy all of the objects of invention referred to above. It provides a non-lethal, anti-personnel device for temporarily disabling adjacent personnel automatically after they are sensed by the device. Those having skill in the relevant arts including TASER® electronics, will perceive various modifications and additions which may be made to the embodiment illustrated. By way of example, the invention could readily be implemented to fire metallic nets instead of darts.

Accordingly, the invention is not to be deemed limited by the disclosure herein but only by the appended claims and their equivalents.

We claim:

1. A non-lethal anti-personnel device for sensing nearby personnel and automatically firing a plurality of electrical discharge darts at such personnel for temporarily disabling the personnel; the device comprising:

a housing having a plurality of firing bays, each such bay having at least one dart for selectively being fired in a predetermined direction;

a plurality of high-voltage transformers, each such transformer being electrically connected to at least one dart by a wire to which the dart remains connected after firing; and means for sensing nearby personnel and activating said firing bays for firing said darts and applying a high-voltage discharge to disable the nearby personnel.

2. The device recited in claim 1 wherein said housing is shaped as a cylinder having a height which is less than the cylinder's diameter.

3. The device recited in claim 2 wherein said firing bays are positioned along a sector of said cylinder at selected angular intervals.

4. The device recited in claim 3 wherein said angular intervals are at about 20 degrees of spacing, one firing bay to the next firing bay.

5. The device recited in claim 1 wherein each said firing bay comprises a cartridge containing two of the said darts.

6. The device recited in claim 5 wherein each of the two darts in each firing bay is configured to be fired at different elevation angle relative to said housing.

7. The device recited in claim 1 wherein said means for sensing nearby personnel comprises an infrared motion detector.

* * * * *